Patented Oct. 17, 1922.

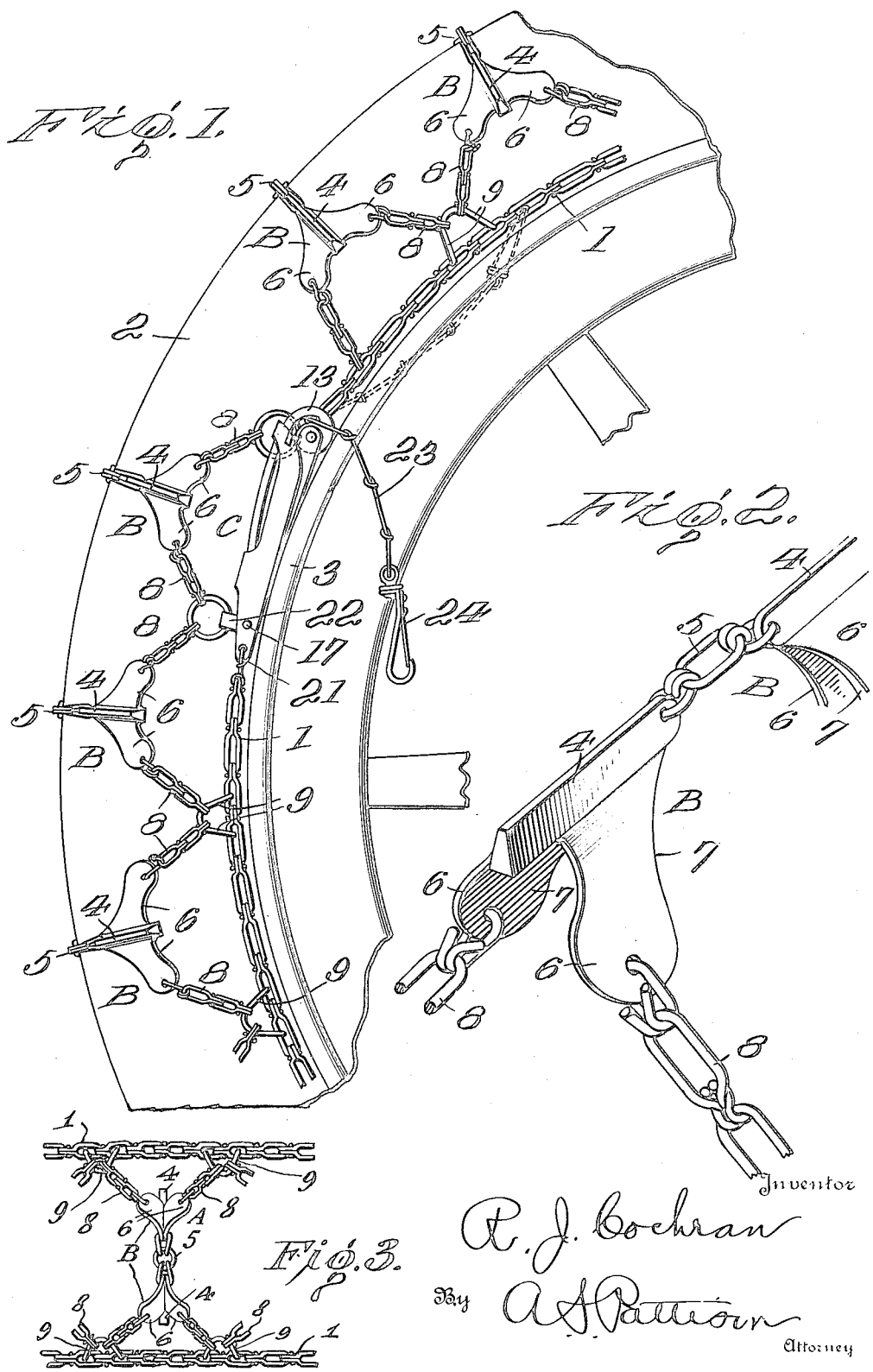

1,432,534

UNITED STATES PATENT OFFICE.

ROBERT JASPER COCHRAN, OF CEDAR, KANSAS.

TIRE CHAIN.

Application filed August 23, 1920. Serial No. 405,320.

*To all whom it may concern:*

Be it known that I, ROBERT JASPER COCHRAN, a citizen of the United States, residing at Cedar, in the county of Smith and State of Kansas, have invented certain new and useful Improvements in Tire Chains, of which the following is a specification, reference being had therein to the accompanying drawing.

This invention relates to improvements in tire chains, which are adapted to be applied to and removed from the tire.

The primary object of my invention is to provide a tire chain carrying a plurality of projections adapted to engage the surface upon which the tire rests to prevent it from slipping thereon.

Another object of my invention is to provide a tire chain which is so constructed that it is particularly adapted to prevent the slipping of the tire on a muddy or soft surface, thereby causing sufficient traction to drive the vehicle to which the tire is applied.

Another object of my invention is to provide an improved fastening lever for the ends of the chain.

Further objects of my invention will appear from the following description and disclosure.

In the accompanying drawings,

Figure 1 is a side view of part of a tire showing my improved chain applied thereto.

Fig. 2 is an enlarged perspective view of X-shaped transverse portions of my chain, including V-shaped members with projecting teeth.

Fig. 3 is a reduced inside view of a portion of my improved chain, showing the relative arrangement of the side chains and the approximately X-shaped cross-arrangements.

Referring now to the drawings in which similar reference characters indicate the same parts, 1 are the side chains which are common to tire chains. These side chains 1 when applied to the tire 2, rest approximately at the rim 3 of the wheel to which the tire is applied. These two side chains are common to the ordinary tire chains.

My improvement comprises cross-arrangements A, which are approximately X-shaped and connect the side chains 1. These approximately X-shaped cross or connecting members A, comprise two members B. These members B, comprise elongated toothed portions 4, which are connected at their inner ends by a suitable number of rings 5. Two wing-like portions 6 extend from the inner edges of the toothed portions 4 and spread apart. The spread of these wings may be sufficient to cause them to rest flatwise against the outer surfaces of the tire, as shown in Fig. 1, or they may be separated enough to have approximately V-shape in end elevation, as shown in Fig. 2. When in this latter shape, the inner edge 7 of the wings 6 will be curved to fit the outer surface of the tire. A suitable number of links 8 connecting the outer ends of the wings 6 with a U-shaped link 9, which is connected with the links of the side chains 1.

By means of this construction, the side chains 1 are connected by a plurality of approximately X-shaped connections A, each connection having elongated teeth-like portions 4, which extend in a direction transverse of the tire surface. These approximately X-shaped arrangements with teeth-like members 4, form a very effective traction in soft or muddy surfaces to prevent the slipping or turning of the tire thereon, as will be readily understood, while at the same time the links 5 are at the periphery of the tire, as shown in Fig. 1.

I provide a fastener C connecting the ends of the side chain. One end of the fastener C is connected in any suitable manner with one end of the side chain 1, as at 21, and the outer end of the adjacent link-member 8 is connected to the lug 22, which is pivoted at 17 to the fastener C.

Persons who have handled the ordinary tire chains have realized at times the difficulty of hooking the loose ends of the tire chain to the fastening lever. For the purpose of providing a hand-hold to permit the free ends of the side chains to be readily pulled to the proper adjustment, I extend them to form hand-holds 23, whereby the chains can be readily pulled tight to the proper adjustment with the fastener C. The free ends of these hand-holds 23 are provided with suitable snap hooks 24, so that they may be snapped into one of the links of the side chain for the purpose of preventing it from dangling and slipping against the fender of the automobile.

By this arrangement, I provide a tire chain having a very efficient traction in soft and muddy surfaces and which has its side chains provided with extensions to form hand-holds, all of which will be found efficient for the purposes intended.

Having thus described my invention, what I claim and desire to secure by Letters Patent is:—

1. An improved tire chain comprising side chains, a plurality of approximately X-shaped connections connecting the side chains, the X-shaped connections including two wing-like members having their apices connected by links and the ends of their wings connected by links to the side chains.

2. An improved tire chain comprising side chains, a plurality of connections connecting the side chains, the connections between the side chains including two wing-like members of a V-shape in cross-section and having tooth-like apices extending longitudinally the V of the wing members, and the apices of the wing-like members connected, for the purpose described.

3. An improved tire chain comprising side chains, a plurality of cross-connections connecting the side chains, said connections including elongated tooth-like projections extending in a direction transverse the tire and supported away from the tire by oppositely extending wing members having their apices connected by links and the ends of their wings connected to the side chains.

4. An improved tire chain, comprising side chains having a plurality of cross-connections, the cross-connections being approximately X-shaped, the cross connections including two wing-like members having link connections between themselves and the side chains so as to position the members on opposite sides of a tire tread.

In testimony whereof I hereunto affix my signature.

ROBERT JASPER COCHRAN.